United States Patent
Wallake

(10) Patent No.: US 9,163,573 B2
(45) Date of Patent: Oct. 20, 2015

(54) INTERNAL COMBUSTION ENGINE SYSTEM FOR INDUSTRIAL APPLICATIONS

(76) Inventor: Chris Wallake, Grove City, OH (US)

(*) Notice: Subject to any disclaimer, the term of this patent is extended or adjusted under 35 U.S.C. 154(b) by 571 days.

(21) Appl. No.: 13/607,802

(22) Filed: Sep. 9, 2012

(65) Prior Publication Data
US 2014/0069373 A1    Mar. 13, 2014

(51) Int. Cl.
| | |
|---|---|
| F02D 41/14 | (2006.01) |
| F02D 41/06 | (2006.01) |
| F02D 41/00 | (2006.01) |
| F02D 19/06 | (2006.01) |
| F02D 29/00 | (2006.01) |
| F02D 31/00 | (2006.01) |
| F02B 43/10 | (2006.01) |
| F02B 63/06 | (2006.01) |
| F02B 63/04 | (2006.01) |

(52) U.S. Cl.
CPC .......... *F02D 41/064* (2013.01); *F02D 41/0025* (2013.01); *F02B 43/10* (2013.01); *F02B 63/042* (2013.01); *F02B 63/06* (2013.01); *F02D 19/0649* (2013.01); *F02D 29/00* (2013.01); *F02D 31/001* (2013.01); *Y02T 10/36* (2013.01)

(58) Field of Classification Search
CPC ... F02D 41/14; F02D 41/064; F02D 41/0025; F02D 19/0649; F02D 29/00; F02D 31/001; F02B 3/10; F02B 63/06; F02B 63/042; Y02T 10/36

See application file for complete search history.

(56) References Cited

U.S. PATENT DOCUMENTS

| | | | |
|---|---|---|---|
| 4,335,697 A | | 6/1982 | McLean |
| 4,503,832 A | | 3/1985 | Pefley et al. |
| 4,651,682 A | | 3/1987 | Pefley et al. |
| 5,293,851 A | * | 3/1994 | Schaub .......... 123/260 |
| 5,499,615 A | | 3/1996 | Lawrence et al. |
| 5,623,907 A | | 4/1997 | Cotton et al. |
| 5,816,228 A | | 10/1998 | McCandless |
| 6,044,806 A | * | 4/2000 | Brown ........... F02D 19/025 123/27 GE |
| 6,119,664 A | | 9/2000 | McCandless |
| 6,202,601 B1 | | 3/2001 | Ouellette et al. |
| 7,628,137 B1 | | 12/2009 | McAlister |
| 8,196,567 B2 | * | 6/2012 | Pursifull et al. ...... 701/112 |
| 2010/0108023 A1 | | 5/2010 | McAlister |
| 2010/0183993 A1 | | 7/2010 | McAlister |
| 2011/0042476 A1 | | 2/2011 | McAlister |
| 2011/0048374 A1 | | 3/2011 | McAlister |
| 2011/0288751 A1 | | 11/2011 | Kurtz |

* cited by examiner

*Primary Examiner* — Hieu T Vo
(74) *Attorney, Agent, or Firm* — Benesch Friedlander Coplan & Aronoff LLP; Benjamen E. Kern; Thomas Y. Kendrick

(57) ABSTRACT

Methods, systems, and apparatuses are enclosed for an internal combustion engine system for industrial applications.

20 Claims, 2 Drawing Sheets

| Providing an industrial internal combustion liquid propane-fueled engine, comprising: at least one intake port, a fuel injection system comprising at least one fuel injector configured to inject liquid propane into the at least one intake port, an engine controller comprising a governor device configured to maintain the speed of the engine at or near a predetermined value, and a starter | 200 |

↓

| Providing a fuel cell configured to hold the liquid propane, wherein the fuel cell comprises a fuel pump capable of both transferring the liquid propane to the fuel injection system and removing a propane vapor from the fuel injection system | 210 |

↓

| Operating the fuel pump in a first configuration wherein the fuel pump removes propane vapor from the fuel injection system | 220 |

↓

| Operating the fuel pump in a second configuration wherein the fuel pump transfers liquid propane to the fuel injection system | 230 |

↓

| Activating the fuel injection system to cause the at least one fuel injector to inject liquid propane into the at least one intake port | 240 |

↓

| Activating the starter | 250 |

Figure 2

INTERNAL COMBUSTION ENGINE SYSTEM FOR INDUSTRIAL APPLICATIONS

BACKGROUND

As a result of the cost of electricity, and remoteness of many worksites and operations, a significant number of organizations rely upon stationary industrial engines to perform a variety of operations and run a variety of stationary equipment. Such engines are typically powered by gasoline or diesel fuels and configured to be stationary on a platform or stand.

With the rising price of fossil fuels, and more stringent government emission requirements, many organizations are seeking less expensive and cleaner alternatives to gasoline and diesel in the powering of stationary industrial engines. Such alternatives include propane and natural gas. However, the use of propane and natural gas has included a variety of drawbacks, including a decrease in engine efficiency due to the method of injecting the fuels into the engines, and an inability to easily start and maintain engine idle in cold climates.

What is needed is a stationary industrial engine having improved efficiency and the ability to operate acceptably and reliably in cold climates.

SUMMARY

In one embodiment, an industrial internal combustion liquid propane-fueled engine is provided, the engine comprising: at least one intake port; a fuel injection system comprising at least one fuel injector configured to inject liquid propane into the at least one intake port; and an engine controller comprising a governor device configured to maintain the speed of the engine at or near a predetermined value.

In another embodiment, a system for powering stationary industrial equipment is provided, the system comprising: an industrial internal combustion liquid propane-fueled engine, comprising: at least one intake port, a fuel injection system comprising at least one fuel injector configured to inject liquid propane into the at least one intake port, and an engine controller comprising a governor device configured to maintain the speed of the engine at or near a predetermined value; and a fuel cell configured to hold the liquid propane.

In another embodiment, a method for starting an industrial internal combustion liquid propane-fueled engine is provided, the method comprising: providing an industrial internal combustion liquid propane-fueled engine, comprising: at least one intake port, a fuel injection system comprising at least one fuel injector configured to inject liquid propane into the at least one intake port, an engine controller comprising a governor device configured to maintain the speed of the engine at or near a predetermined value, and a starter; providing a fuel cell configured to hold the liquid propane, wherein the fuel cell comprises a fuel pump capable of both transferring the liquid propane to the fuel injection system and removing a propane vapor from the fuel injection system; operating the fuel pump in a first configuration wherein the fuel pump removes propane vapor from the fuel injection system; operating the fuel pump in a second configuration wherein the fuel pump transfers liquid propane to the fuel injection system; activating the fuel injection system to cause the at least one fuel injector to inject liquid propane into the at least one intake port; and activating the starter.

BRIEF DESCRIPTION OF THE DRAWINGS

The accompanying figures, which are incorporated in and constitute a part of the specification, illustrate various example apparatuses, systems, and methods, and are used merely to illustrate various example embodiments.

FIG. 2 is a flowchart illustrating an example method for starting an industrial internal combustion liquid propane-fueled engine.

DETAILED DESCRIPTION

Figure 1:
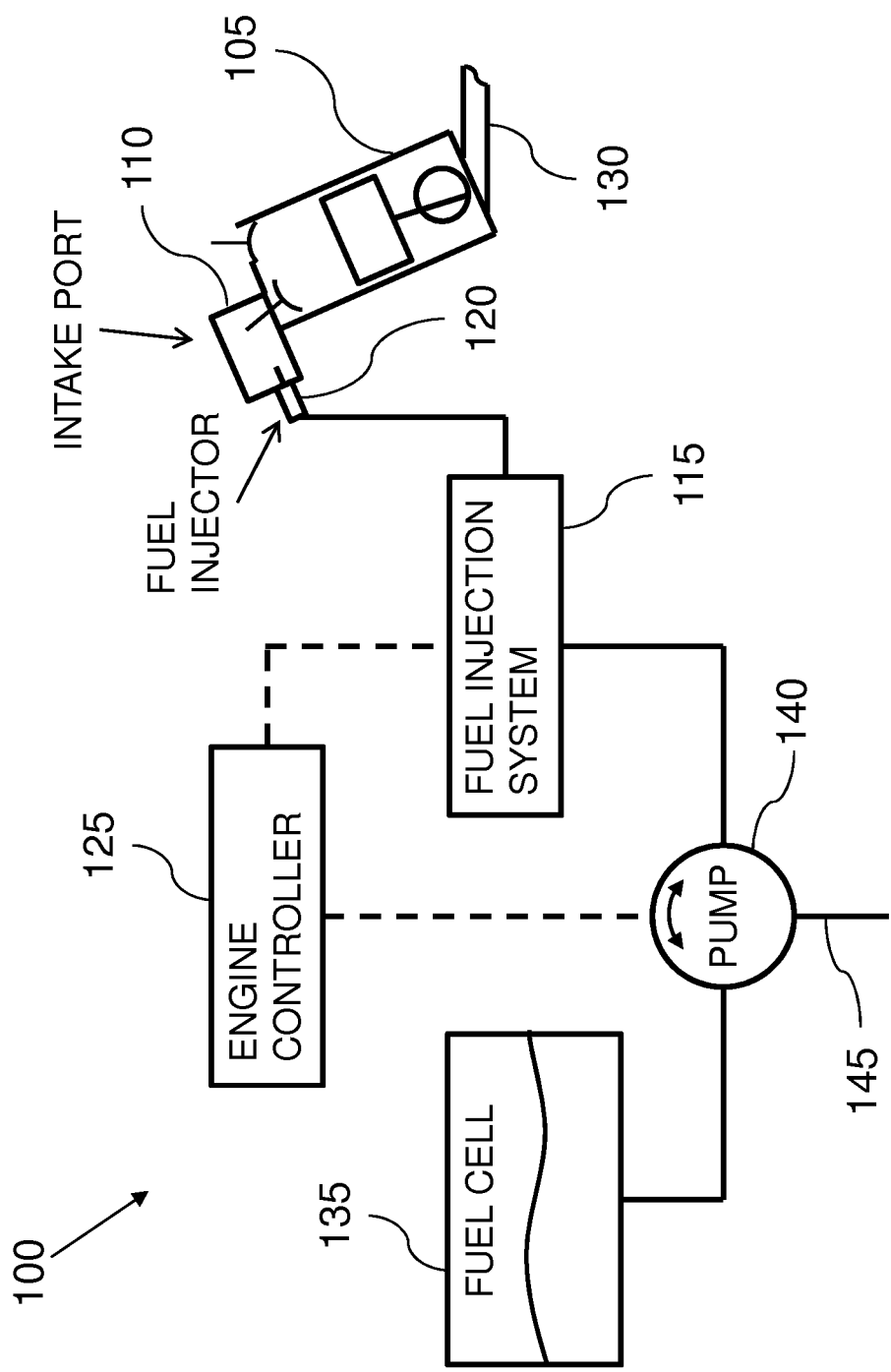
FIG. 1 illustrates an example arrangement of a system for powering stationary industrial equipment.

FIG. 1 illustrates a schematic view of an example arrangement of a system 100 of an industrial internal combustion liquid propane-fueled engine 105. Engine 105 comprises at least one intake port 110. Engine 105 may additionally comprise a fuel injection system 115 including at least one fuel injector 120. Fuel injector 120 may be configured to inject a fuel, such as liquid propane, into the at least one intake port 110. Engine 105 may additionally include an engine controller 125 comprising a governor device configured to maintain the speed of engine 105 at or near a predetermined value. In one embodiment, engine 105 may further comprise an output component 130 configured to transfer energy from engine 105 to any of various stationary equipment.

In one embodiment, system 100 further comprises a fuel cell 135. System 100 may additionally include a fuel pump 140 capable of both transferring liquid propane from fuel cell 135 to fuel injection system 115 and removing propane vapor from fuel injection system 115. When operating to draw propane vapor from fuel injection system 115, fuel pump 140 may be run in a first direction to cause propane vapor to travel from fuel injection system 115 and out exhaust 145. In another embodiment, fuel pump 140 may be run in a first direction to cause propane vapor to travel from engine 105.

System 100 may be configured to provide power to any of a variety of stationary industrial equipment. In one embodiment, system 100 is configured to provide power to at least one of a generator, a pump, a wind machine, and a mixing plant. The generator may include a generator for producing electricity. The pump may include a hydraulic pump or irrigation pump. The wind machine may be configured to apply air to orchards or crops. The mixing plant may be an asphalt mixing plant. The term "stationary" should be understood to mean an object that cannot ambulate under its own power. Stated differently, this description contemplates stationary devices to include those that need an independent engine to perform only one or more tasks that are not related to traveling. Thus, even though a particular piece of equipment can be placed on a truck or trailer and moved from one site to another, it is still considered a stationary device for the purposes of this application if it cannot travel by virtue of some means integral to that piece of equipment (i.e., a drivetrain for turning wheels or tracks).

Engine 105 may include any internal combustion engine. In one embodiment, engine 105 is a spark-ignited engine and includes at least one spark ignition system. The spark ignition system may include at least one spark plug. In one embodiment, engine 105 is a modified spark-ignited gasoline engine configured to operate on liquid propane or natural gas.

It should be noted that engine 105 is not configured to be a compression-ignited engine, which is commonly referred to as a diesel engine. A diesel engine relies upon auto-ignition of its fuel by raising it to a specified temperature (which temperature is obtained through compressing the fuel). A diesel engine does not rely upon a spark-ignition to ignite its fuel and as such should not be confused with a spark-ignited engine.

In one embodiment, engine 105 is be configured to operate using propane in its substantially liquid phase. The liquid phase propane may be contained in fuel cell 135 in its substantially liquid phase. Liquid propane may vaporize within fuel cell 135, such that fuel cell 135 actually contains a mixture of propane gas and liquid propane. Because liquid propane is denser and thus heavier than propane gas, propane gas floats on top of liquid propane. In one embodiment, liquid propane is fed from the bottom of fuel cell 135. In another embodiment, engine 105 is configured to operate using natural gas in its substantially gaseous phase.

In prior art stationary industrial engines operating using propane, the propane is introduced into the combustion chamber in its gaseous phase. These prior art systems included applying propane gas to the air stream in a process known as fogging. The propane gas would mix with the air on its way to the combustion chamber, where the propane gas/air mixture was compressed and ignited. However, such prior art systems suffered a variety of flaws, including loss in efficiency due to propane gas's displacement of oxygen when introduced to the intake air stream. As oxygen is a necessary component of combustion, the displacement of oxygen has negative effects on the energy produced in the combustion chamber during combustion. This loss in efficiency caused such prior art systems to be up to or greater than 20% less efficient than comparable diesel compression-ignited engines and gasoline spark-ignited engines.

Another flaw found in prior art fogging systems was an oversized fuel cell and/or less than optimal fuel cell capacity. Because the prior art system was configured to start up on propane gas, the fuel cells were only filled partway with liquid propane. Such liquid propane would vaporize and fill the upper unoccupied portion of the fuel cell with propane gas. Upon starting, the engine would have a supply of propane gas lingering in the fuel cell, which could then be used to run the engine until the engine reached its operating temperature. After the engine reached its operating temperature, the engine was hot enough to vaporize liquid propane introduced to the engine's evaporator, which produced propane gas to be fed into the engine's intake air stream. As such, fuel cell capacity and/or size suffered in prior art systems.

Still another flaw found in prior art fogging systems was an inability to quickly and reliably start the engine, especially in cold weather. In cold environments, liquid propane does not vaporize as readily as in a warm environment. As such, the fuel cell would not naturally have a significant supply of propane gas floating on top of the liquid propane. As these prior art systems require propane gas to start up, the engine was often starved for fuel, causing it to repeatedly shut down and require restarting. This process of engine shutdown and restart was required until the engine gained enough heat to vaporize liquid propane introduced to the engine's evaporator.

The present invention overcomes at least each of the flaws noted above with respect to prior art engines. Because the present invention engine 105 operates on liquid propane, its fuel cell 135 can be filled to full capacity and be more compact in size. Additionally, because the present invention operates on liquid propane, it can be started in cold weather after which it will continuously run, rather than experience the repeated shutdown and restart sequence of the prior art system. Finally, because the present invention operates on liquid propane injected into at least one intake port 110, the liquid propane does not displace oxygen, thereby maintaining efficiency that is similar to or better than comparable diesel and gasoline engines.

In one embodiment, the present invention is configured to start and operate within a range of ambient temperatures from about −50 degrees Fahrenheit to about 50 degrees Fahrenheit without any external heat input. In one embodiment, the present invention is configured to start and operate at ambient temperatures less than about −50 degrees Fahrenheit and greater than about 50 degrees Fahrenheit without any external heat input. In another embodiment, the present invention is configured to start and operate in arctic conditions. The present invention may actually start and operate better as the ambient temperature is lowered, as the liquid propane that is stored in the ambient temperature and fed to engine 105 is denser and more likely to be in liquid state as the ambient temperature is lowered. This is as opposed to prior art fogging systems, where the engine needs to be supplied with propane in its gaseous form.

In one embodiment, engine 105 comprises at least one intake port 110. In another embodiment, engine 105 comprises one intake port 110 for each cylinder in engine 105. In another embodiment, the at least one intake port 110 is part of at least one intake manifold (not shown). In one embodiment, engine 105 is a fuel injected engine wherein the air intake is connected to an intake manifold, wherein the intake manifold is configured to only transport air to each of the cylinders of engine 105. In this embodiment, air is transferred from the intake manifold to each of the cylinders of engine 105 while propane is injected into each of the cylinders via the at least one intake port 110 for each of the cylinders of engine 105. In one embodiment, pump 140 is configured to force a fuel, such as liquid propane through at least one fuel line from fuel cell 135 to the at least one fuel injector 120, wherein fuel injector 120 injects the fuel into the intake port 110. The fuel may travel through the intake port 110 into the combustion chamber of engine 105. In one embodiment, the at least one fuel injector 120 injects natural gas into the at least one intake port 110.

In one embodiment, engine 105 comprises a fuel injection system 115. Fuel injection system 115 may be an electronic fuel injection system. In another embodiment, fuel injection system 115 comprises a fuel manifold (not shown) configured to receive fuel from fuel pump 140 and distribute it to the at least one fuel injector 120. In one embodiment, engine 105 comprises one fuel injector 120 for each of the cylinders of engine 105. In another embodiment, fuel injection system 115 is configured to receive fuel from fuel pump 140 and distribute it to the at least one fuel injector 120. In another embodiment, fuel injection system 115 comprises a control to activate and deactivate the at least one fuel injector 120 when needed. That is, fuel injection system 115 may be connected (e.g., electrically, hydraulically, pneumatically, or mechanically) to engine controller 125, wherein engine controller 125 communicates with fuel injection system 115 to open or close the at least one fuel injector 120. Fuel injection system 115 may be configured to operate a plurality of fuel injectors 120 (one per cylinder) in a specific order to correspond to the firing sequence of engine 105. Each of the plurality of fuel injectors 120 may inject liquid propane fuel into the intake port 110 associated with each cylinder of engine 105. In another embodiment, fuel injection system 115 and the at least one fuel injector 120 may inject natural gas into engine 105.

In one embodiment, fuel injection system 115 injects fuel, such as liquid propane or natural gas, into the at least one intake port 110 under pressure. Pressure may be provided by fuel pump 140. In another embodiment, fuel injection system 115 injects fuel into the at least one intake port 110 in metered and/or measured amounts. That is, fuel injection system 115 provide a specific amount of fuel into the at least one intake port 110 and/or monitors the amount injected.

Engine 105 may comprise an engine controller 125. In one embodiment, engine controller 125 comprises a powertrain control module. In one embodiment, engine controller 125 comprises a computer. In one embodiment, engine controller 125 controls the rate and timing of fuel supplied to engine 105. Engine controller 125 may be designed with a unique algorithm formulated specifically to control fuel injection in engine 105 for starting and operating engine 105 in specific ambient temperatures. In another embodiment, engine controller 125 configures sensors within engine 105 to implement starting and operating engine 105 in specific ambient temperatures.

In one embodiment, engine controller 125 is any device configured to control the firing sequence, ignition, timing, and revolutions per minute ("RPM") of engine 105. In one embodiment, engine controller 125 comprises a governor device configured to maintain the speed (RPM) of the engine at or near a predetermined value. The speed/RPM of engine 105 may include any of a range of possible values within the operating range of engine 105, as selected by a user. For example, engine 105 may be operated at or near about 2,550 RPM. In one embodiment, engine 105 may be operated between about 300 RPM and 8,000 RPM. In another embodiment, engine 105 may be operated between about 500 RPM and 6,000 RPM. In another embodiment, engine 105 may be operated between about 1,000 RPM and 4,000 RPM. In one embodiment, engine 105 is governed via a governor device to operate at or near a specific predetermined RPM constantly. Governing an engine to operate at or near a specific predetermined RPM constantly may be referred to as operating in a steady state.

In one embodiment, the desired and predetermined engine speed of engine 105 is at least partially dependent upon the equipment to which engine 105 is providing power. For example, engine 105 may operate a pump that is required to run at 3,000 RPM. In such a situation, engine 105 after startup would be governed to run at or near 3,000 RPM continuously.

In one embodiment, engine 105 includes output component 130. Output component 130 may electrically, hydraulically, pneumatically, or mechanically couple engine 105 to the equipment to which engine 105 is providing power. Output component 130 may include one or more of a flywheel, a shaft, a gear, and a power takeoff. In one embodiment, output component 130 is a shaft configured to rotatably power equipment. Output component 130 may provide power from engine 105 to at least one of a generator, a pump, a wind machine, and a mixing plant. In one embodiment, the system 100 is configured to provide power to at least one of a generator, a pump, a wind machine, and a mixing plant.

System 100 may include fuel cell 135 configured to contain a fuel, such as liquid propane or natural gas. In one embodiment, fuel cell 135 is remote from engine 105. In another embodiment, fuel cell 135 is integral to engine 105. In one embodiment, fuel cell comprises a fuel pump 140. In another embodiment, fuel pump 140 is a component of engine 105. In one embodiment, fuel pump 140 is configured to transfer fuel such as liquid propane to fuel injection system 115. In another embodiment, fuel pump 140 is configured to remove propane vapor such as propane gas from fuel injection system 115. In one embodiment, fuel pump 140 is configured to transfer fuel such as liquid propane to at least one fuel injector 120. In another embodiment, fuel pump 140 is configured to remove propane vapor such as propane gas from at least one fuel injector 120. Fuel pump 140 may direct propane vapor out exhaust 145. In one embodiment, fuel pump 140 operates in a first configuration where it extracts propane vapor from fuel injection system 115. The extracted propane vapor may be discharged out exhaust 145. In another embodiment, fuel pump 140 operates in a second configuration where it draws fuel such as liquid propane from fuel cell 135. During this process, fuel pump 140 may draw an amount of residual propane vapor from the fuel line between fuel cell 135 and fuel pump 140, which propane vapor it may discharge out exhaust 145. In the second configuration, fuel pump 140 may transfer liquid propane from fuel cell 135 to fuel injection system 115. Fuel injection system 115 may then operate to inject the fuel, under pressure, through at least one fuel injector 120 into the at least one intake port 110.

FIG. 2 is a flowchart illustrating an example method for starting an industrial internal combustion liquid propane-fueled engine. As shown in FIG. 2, the example method includes providing an industrial internal combustion liquid propane-fueled engine, comprising: at least one intake port, a fuel injection system comprising at least one fuel injector configured to inject liquid propane into the at least one intake port, an engine controller comprising a governor device configured to maintain the speed of the engine at or near a predetermined value, and a starter (step 200). The example method further includes providing a fuel cell configured to hold the liquid propane, wherein the fuel cell comprises a fuel pump capable of both transferring the liquid propane to the fuel injection system and removing a propane vapor from the fuel injection system (step 210). The example method also includes operating the fuel pump in a first configuration wherein the fuel pump removes propane vapor from the fuel injection system (step 220), operating the fuel pump in a second configuration wherein the fuel pump transfers liquid propane to the fuel injection system (step 230), activating the fuel injection system to cause the at least one fuel injector to inject liquid propane into the at least one intake port (step 240), and activating the starter (step 250).

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail.

Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. An industrial combustion liquid propane-fueled engine, comprising:
   at least one intake port;
   a fuel injection system comprising at least one fuel injector configured to inject liquid propane into the at least one intake port; and
   an engine controller comprising a governor device configured to maintain the speed of the engine at or near a predetermined value, wherein the engine controller controls the at least one fuel injector to control a rate and a timing of fuel injection into the at least one intake port based on at least one of: the predetermined value as selected by a user, the predetermined value as selected by the engine controller, and the predetermined value as sensed by a powertrain control module and communicated to and controlled by the engine controller.

2. The engine of claim 1, further comprising at least one spark-ignition system.

3. The engine of claim 1, wherein the engine is configured to provide power to at least one of a generator, a pump, a wind machine, and a mixing plant.

4. The engine of claim 1, further comprising at least one fuel cell configured to contain the liquid propane, the at least one fuel cell comprising a fuel pump capable of both transferring the liquid propane to the fuel injection system and removing a propane vapor from the fuel injection system.

5. The engine of claim 1, wherein the fuel injection system injects the liquid propane into the at least one intake port under pressure.

6. The engine of claim 1, wherein the fuel injection system injects metered and measured amounts of the liquid propane into the at least one intake port.

7. The engine of claim 1, wherein the engine is configured to start and operate within a range of ambient temperatures from about −50 degrees Fahrenheit to about 50 degrees Fahrenheit without external heat input.

8. A system for powering stationary industrial equipment, comprising:
   an industrial internal combustion liquid propane-fueled engine, comprising:
      at least one intake port,
      a fuel injection system comprising at least one fuel injector configured to inject liquid propane into the at least one intake port, and
      an engine controller comprising a governor device configured to maintain the speed of the engine at or near a predetermined value, wherein the engine controller controls the at least one fuel injector to control a rate and a timing of fuel injection into the at least one intake port based on at least one of: the predetermined value as selected by a user, the predetermined value as selected by the engine controller, and the predetermined value as sensed by a powertrain control module and communicated to and controlled by the engine controller; and
   a fuel cell configured to hold the liquid propane.

9. The system of claim 8, wherein the fuel cell comprises a fuel pump capable of both transferring the liquid propane to the fuel injection system and removing a propane vapor from the fuel injection system.

10. The system of claim 8, wherein the engine further comprises at least one spark-ignition system.

11. The system of claim 8, wherein the system is configured to provide power to at least one of a generator, a pump, a wind machine, and a mixing plant.

12. The system of claim 8, wherein the fuel injection system injects the liquid propane into the at least one intake port under pressure.

13. The system of claim 8, wherein the fuel injection system injects metered and measured amounts of the liquid propane into the at least one intake port.

14. The system of claim 8, wherein the system is configured to start and operate within a range of ambient temperatures from about −50 degrees Fahrenheit to about 50 degrees Fahrenheit without external heat input.

15. A method for starting an industrial internal combustion liquid propane-fueled engine, comprising:
   providing an industrial internal combustion liquid propane-fueled engine, comprising:
      at least one intake port,
      a fuel injection system comprising at least one fuel injector configured to inject liquid propane into the at least one intake port,
      an engine controller comprising a governor device configured to maintain the speed of the engine at or near a predetermined value, and
      a starter;
   providing a fuel cell configured to hold the liquid propane, wherein the fuel cell comprises a fuel pump capable of both transferring the liquid propane to the fuel injection system and removing a propane vapor from the fuel injection system;
   operating the fuel pump in a first configuration wherein the fuel pump removes propane vapor from the fuel injection system;
   operating the fuel pump in a second configuration wherein the fuel pump transfers liquid propane to the fuel injection system;
   activating the fuel injection system to cause the at least one fuel injector to inject liquid propane into the at least one intake port; and
   activating the starter.

16. The method of claim 15, wherein the engine further comprises at least one spark-ignition system.

17. The method of claim 15, wherein the engine is configured to provide power to at least one of a generator, a pump, a wind machine, and a mixing plant.

18. The method of claim 15, wherein the fuel injection system injects the liquid propane into the at least one intake port under pressure.

19. The method of claim 15, wherein the fuel injection system injects metered and measured amounts of the liquid propane into the at least one intake port.

20. The method of claim 15, wherein the engine is configured to start and operate within a range of ambient temperatures from about −50 degrees Fahrenheit to about 50 degrees Fahrenheit without external heat input.

* * * * *